United States Patent [19]

Mastroni

[11] 4,441,837

[45] Apr. 10, 1984

[54] GOLF CLUB COUPLING ASSEMBLY

[76] Inventor: Joseph Mastroni, 462 W. Fairway Cir., Mesa, Ariz. 85201

[21] Appl. No.: 299,425

[22] Filed: Sep. 4, 1981

[51] Int. Cl.³ .......................... B25G 3/00; F16B 7/18; F16D 1/00; F16L 15/00
[52] U.S. Cl. .................................. 403/300; 273/32 F; 273/162 E; 403/305; 403/314
[58] Field of Search ............... 403/300, 302, 305, 314, 403/141, 21; 273/32 F, 162 E; 219/19 A; 285/246, 248, 322

[56] References Cited

U.S. PATENT DOCUMENTS

| | | | |
|---|---|---|---|
| 612,685 | 10/1898 | Thorp et al. | 403/300 X |
| 683,312 | 9/1901 | Marquardt | 285/322 X |
| 1,807,559 | 5/1931 | Smith | 403/305 |
| 2,339,488 | 1/1944 | Kratoville | 403/305 |
| 4,288,112 | 9/1981 | Stoll | 285/322 X |
| 4,328,979 | 5/1982 | Stoll | 285/322 X |

*Primary Examiner*—Wayne L. Shedd
*Attorney, Agent, or Firm*—Neil F. Markva

[57] ABSTRACT

A coupling assembly for joining a pair of golf clubs comprising a housing portion and gripping portions disposed along a longitudinal axis. The housing portion has first and second receiving ends and the gripping portions define a bore for receiving the ends of two golf clubs. A tightening mechanism is mounted to cause the gripping portions to move between an open position and a contracted gripping position wherein the tapered handle of the golf clubs is tightly gripped. In a specific embodiment the gripping portions include gripping sections spaced from one another in the open position and are movable toward each other to the contracted gripping position.

11 Claims, 8 Drawing Figures

U.S. Patent  Apr. 10, 1984  Sheet 1 of 2  4,441,837
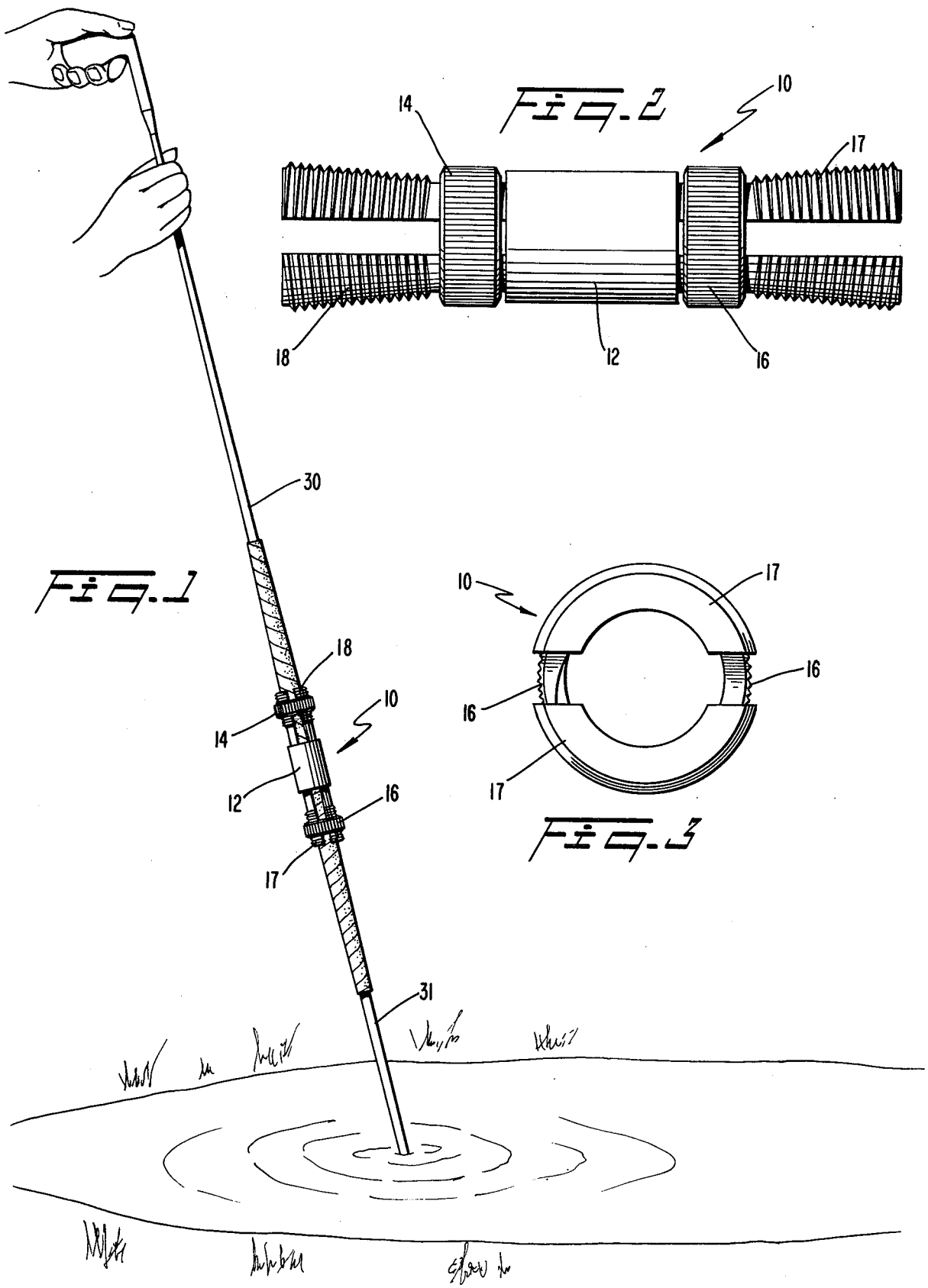

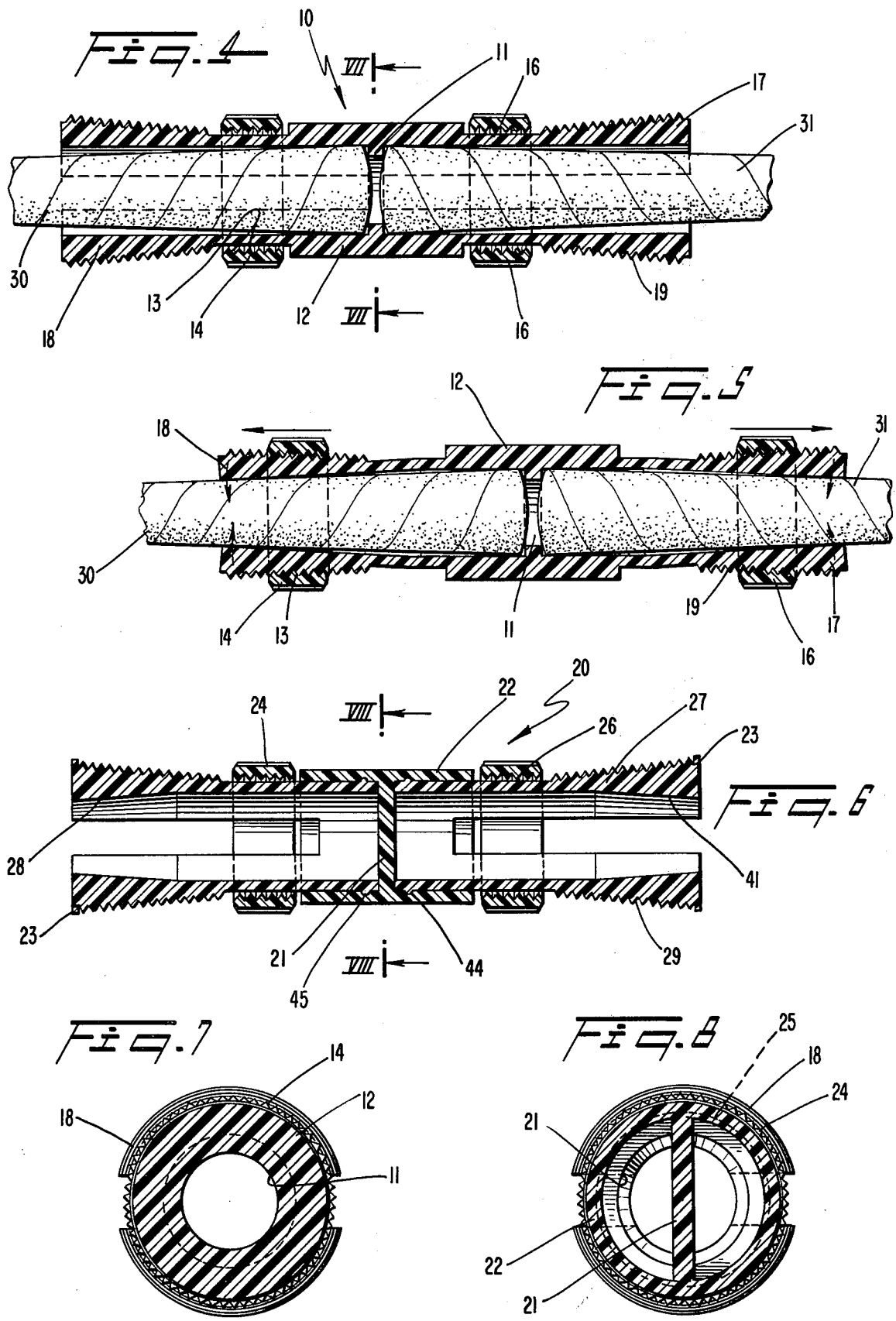

GOLF CLUB COUPLING ASSEMBLY

FIELD OF THE INVENTION

This invention relates to a coupling assembly for joining two golf club handles to enable a person to use the joined clubs as a golf ball retrieving device.

BACKGROUND OF THE INVENTION

During the play of a golf game, there are numerous instances in which the golf ball ends up in the water or in some remote area. There are many known devices for retrieving golf balls. Such golf ball retrieving devices have been shown and described in detail in U.S. Pat. Nos. 4,216,831, 1,723,709, 3,922,027. Such golf ball retrieving devices may be grouped in two categories. The first category includes specially designed retrieving devices which will be carried by the golfer in addition to the usual golf clubs. The second category includes attachments for the golf club to convert the same into a ball retrieving device. In the first instance, the golfer is forced to carry additional equipment which is inconvenient and cumbersome. In the second instance, the golf club and retrieving attachment combination may not be long enough to reach the relative remote areas.

Thus, there is a need for an effective means for easily and conveniently retrieving golf balls without cumbersome additional equipment. Furthermore, there are no known coupling assemblies for joining two golf clubs to form a relatively long golf ball retrieving device.

OBJECTS OF THE INVENTION

An object of this present invention is to provide a coupling assembly for joining two golf club handles so that the joined golf clubs can be used for retrieving golf balls.

Another object of this invention is to provide a coupling assembly which is simple to use for joining two golf club handles, is conveniently carried by the golfer and inexpensive to manufacture.

Another object of this invention is to provide a golf club coupling assembly which eliminates the need for carrying additional cumbersome devices for retrieving the golf balls.

SUMMARY OF THE INVENTION

As described and disclosed herein, the coupling assembly comprises a housing portion and two gripping portions disposed along a longitudinal axis. The housing portion has a substantially tubular configuration with first and second opposed receiving ends for receiving first and second golf club handles. As is well known, all golf clubs have a tapered handle or grip end section. A gripping portion of the coupling assembly is disposed adjacent each one of the receiving ends and tightening means are mounted to cause each gripping portion to operate between an open position and a closed or contracted, gripping position. The gripping portion has an increasing cross-sectional thickness along the longitudinal axis away from the housing.

A feature of the invention is directed to tightening means which include a tightening member movably mounted on the gripping portions for movement along the longitudinal axis to cause the gripping portion to operate between the open and contracted positions. The tightening member may be in the form of a nut movably mounted on the gripping portion. A stop at the end of the gripping portion prevents the tightening member from disengaging the respective gripping portions. An abutment means against which the club handle end rests, is provided within the housing. The gripping portion has an increasing cross-sectional thickness and comprises two flexible gripping sections spaced from one another. The gripping sections move toward and away from one another as the tightening member moves along the longitudinal axis thereby tightening or releasing the golf club handle. The gripping portions may be fixedly attached or removably connected to the housing portion.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a perspective view showing the use of two golf club handles joined with the coupling assembly of the present invention;

FIG. 2 is an elevational view of a coupling assembly made according to the invention;

FIG. 3 is an end elevational view of the coupling assembly as shown in FIG. 2;

FIG. 4 is a sectional view of a coupling assembly made in accordance with this invention;

FIG. 5 is a sectional view of a coupling assembly in a contracted, gripping position where gripping elements firmly engage the golf club handles;

FIG. 6 is a cross-sectional view of a further embodiment of a coupling assembly made in accordance with the invention;

FIG. 7 is a cross-sectional view along the line VII-VII of FIG. 4;

FIG. 8 is a cross-sectional view along line VIII-VIII of FIG. 6;

DETAILED DESCRIPTION

Referring to FIG. 1, a pair of golf clubs are shown being used coupled together with a coupling assembly 10 of the present invention for retrieving a golf ball from a water hazard shown in all the drawings, the grip end of each handle 30 and 31 is tapered in accordance with the usual construction of golf clubs.

Coupling assembly 10 has a housing portion 12, gripping portions having gripping elements or sections 17 and 18, and tightening elements 14 and 16. Housing portion 12 is of tubular construction and is composed of substantially rigid plastic material which may be easily injection molded.

As shown in FIG. 4, gripping elements 17 and 18 are integrally formed with housing portion 12 and extend outwardly therefrom along the longitudinal axis of the assembly 10. Gripping elements 17 and 18 define a bore which extends along the longitudinal axis and is in open communication with the receiving ends of housing portion 12. The bore has a substantially uniform diameter. An abutment means 11 is formed around the inner periphery of housing portion 12 intermediate the ends thereof. Abutment means 11 serves as a support surface for the ends of the golf club handles.

Each of the gripping sections or elements 17 and 18 which are spaced from one another. The spacing and the flexible construction of sections 17 and 18 provide the necessary spring action for the gripping sections to move between an open position and a contracted, gripping position. The gripping sections 17 and 18 have a cross-sectional thickness which increases along its longitudinal axis away from housing portion 12. Thus, as is evident in the drawings, the line within the gripping portions is tapered inwardly to engage the tapered handle ends of the golf clubs when the gripping sections 17 and 18 are in the contracted, gripping position. The thickness is maximum at the ends of the gripping sections 17 and 18.

Tightening members 14 and 16 are movably disposed over the gripping portions 17 and 18. In this embodiment, tightening members 17 and 18 have internal threads 13 which engage the threaded outer surface 19 of the gripping portions 17 and 18. The outer surface of members 17 and 18 is knurled as shown in FIG. 2 for ease of operation.

The outer ends of the tapered golf club handles 30 and 31 are inserted into the bore defined by the gripping sections 17 and 18 and housing portion 12. The outer ends of handles 30 and 31 are disposed within first and second handle receiving ends and rest against the abutment 11. Tightening members 14 and 16 are rotated and move away from housing portion 12 thereby causing the gripping sections 17 and 18 to move inwardly toward the respective tapered handles 30 and 31 to the contracted, gripping position as shown in FIG. 5.

The coupling assembly 20 shown in FIG. 6 has an abutment 21 which extends completely across the bore and thereby defining the receiving ends of housing portion 22. Gripping portions 27 and 28 are removably connected to housing portion 22 with a frictional coupling mechanism. Housing portion 22 has grooves 45 extending around the inner periphery of the bore and gripping portions 27 and 28 have protrusions 44 formed around the outer periphery. Protrusions 44 are held in grooves 45 by frictional engagement and snap out when pulling force is applied.

Stops 23 are integrally formed at the end of the gripping portions 27 and 28 and radially extend therefrom. Stops 23 keep the tightening members 24 and 26 on the assembly 20. Gripping portions 27 and 28 have exterior threads 29 engaging the interiorly threaded tightening members 24 and 26. Gripping portions 27 and 28 of this embodiment each include a tubular connecting section 40 and a pair of legs extending outwardly therefrom along the longitudinal axis. The bore of the coupling assembly 20 has a substantially uniform diameter along a large portion thereof and has an inwardly directed taper at the end of gripping portions 27 and 28. The tapered surfaces 41 provide a very effective gripping action when the tightening members 24 and 26 move along the longitudinal axis.

The coupling assembly of the present invention can be made out of any material which is substantially rigid and has some resiliency for gripping purposes. The cross-section of housing and gripping portions is circular, but can be of any shape adapted to receive the end of a golf club handle.

The coupling assembly of the present invention is compact in size, and easy to operate. The assembly is very effective for coupling two golf clubs so that a retrieving device having a length which is twice the length of a single golf club may be easily and quickly assembled as the need arises. The coupling assembly of the present invention eliminates the need for carrying any golf club attachment and/or any other retrieving devices adapted specifically for that purpose.

While the golf club coupling assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A coupling assembly for joining the tapered grip ends of two golf clubs to form a golf ball retrieving device, said assembly comprising:
    (a) a housing portion and gripping portions disposed along a longitudinal axis,
    (b) a housing portion having first and second handle receiving ends,
    (c) a gripping portion being disposed adjacent each of the receiving ends and being in open communication with the respective adjacent receiving end, and
    (d) tightening means mounted to cause each of the gripping portions to operate between an open position and a contracted, gripping position,
    (e) said gripping portions being effective to receive the tapered handle end of a golf club when in the open position and being effective to tightly grip the tapered handle end of said golf club when in the contracted, gripping position,
    (f) each gripping portion includes at least two gripping sections laterally spaced with respect to each other and having a structural configuration effective to cause the gripping sections to move toward one another when the gripping portion is in the contracted, gripping position,
    (g) each gripping portion including a threaded outer surface on each of the gripping sections, and
    (h) the tightening means includes a tightening member having a portion which threadingly engages the threaded outer surface of the gripping sections,
    (i) said tightening member being effective to move along the longitudinal axis of the assembly in a direction away from the housing portion outwardly along each of the gripping portions to cause the gripping portion to move from an open position to said contracted, gripping position when the tapered handle end of a golf club is disposed between the spaced gripping sections,
    (j) said gripping sections have a cross-sectional thickness which increases along the longitudinal axis of the assembly in a direction away from the housing portion to form a tapered bore within the gripping portions which engage the tapered grip ends of the golf club when the gripping portion is in the contracted, gripping position.

2. An assembly as defined in claim 1 wherein said gripping sections are composed of resilient material to cause the gripping sections to be flexibly movable between said open position and said contracted, gripping position.

3. A coupling assembly for joining the tapered grip ends of two golf clubs to form a golf ball retrieving device, said assembly comprising:
    (a) a housing portion and gripping portions disposed along a longitudinal axis,
    (b) a housing portion having first and second handle receiving ends,
    (c) a gripping portion being disposed adjacent each of the receiving ends and being in open communication with the respective adjacent receiving end, and (d) tightening means mounted to cause each of the gripping portions to operate between an open position and a contracted, gripping position, (e) said gripping portions being effective to receive the handle end of a golf club when in the open position and being effective to tightly grip the handle end of said golf club when in the contracted, gripping position, (f) the receiving ends and the gripping portions define a bore having a longitudinal axis coextensive with the longitudinal axis of the assembly, (g) the bore defined by the receiving ends has a size and a shape to receive the outer end of a golf club within each of the receiving ends of the housing, (h) said bore has a substantially uniform diameter along a major portion of the longitudinal axis near the housing and has a reduced diameter along a remaining outer portion of the assembly along the longitudinal axis away from said housing.

4. An assembly as defined in claim 3 wherein said bore has a substantially uniform diameter along the longitudinal axis of the assembly when the gripping portions are in the open position.

5. A coupling assembly for joining the tapered grip ends of two golf clubs to form a golf ball retrieving device, said assembly comprising:

(a) a housing portion and gripping portions disposed along a longitudinal axis, (b) a housing portion having first and second handle receiving ends for receiving the outer ends of the two golf clubs, (c) each gripping portion having at least two gripping sections with a threaded outer surface and being disposed adjacent each of the receiving ends and being in open communication with the respective adjacent receiving end, and (d) tightening members having a portion which threadingly engages said threaded outer surface of the gripping sections, (e) said tightening members being mounted to move along the longitudinal axis of the assembly thereby causing the gripping sections to operate between an open position and a contracted, gripping position, (f) said gripping sections being shaped to receive the tapered grip ends of the two golf clubs when in the open position and to form a tapered bore within the gripping portions which tightly engage the tapered handle ends of said golf clubs when the gripping portions are in the contracted, gripping position.

6. An assembly as defined in claim 5 wherein the housing portion includes an abutment means inside the housing intermediate the receiving ends and is effective to contact the outer ends of the golf club handles disposed in each respective receiving end of the housing portion.

7. An assembly as defined in claim 5 wherein each of the gripping portions is fixedly secured to a respective receiving end of the housing portion.

8. An assembly as defined in claim 5 wherein each of the gripping portions is detachably connected to a respective receiving end of the housing portion.

9. An assembly as defined in claim 5 wherein each said gripping portion includes a connector section for effecting a detachable connection with the housing portion and said at least two gripping sections extending outwardly from the connector section.

10. An assembly as defined in claim 9 wherein said connector section includes a frictional locking means for frictionally engaging the inside surface of a respective receiving end of the housing portion.

11. An assembly as defined in claim 5 wherein said gripping portions include stop means located at the outermost end thereof to maintain the tightening members on said assembly.

* * * * *